United States Patent Office 3,679,430
Patented July 25, 1972

3,679,430
CONDITIONER FOR BAKED GOODS
Hermann Birnbaum, Pittsburgh, Pa., assignor to Caravan Products Co., Inc., Totowa, N.J.
No Drawing. Filed Oct. 30, 1969, Ser. No. 872,756
Int. Cl. A21d 2/16
U.S. Cl. 99—90 CB
12 Claims

ABSTRACT OF THE DISCLOSURE

A conditioner that can be added to the fermentation broth in a continuous baking process without causing serious foaming, the conditioner comprising 50–80% of surface active agents selected from polyoxyethylene sorbitan esters of fatty acids having 16–18 carbon atoms or ethoxylated monoglycerides, and a hard monoglyceride, and 50–20% of fatty materials comprising a combination of a saturated fatty material such as hydrogenated lard and an unsaturated fatty material such as lard. The preferred form of the conditioner is that of a thick aqueous emulsion containing 40–50% water. While eliminating foaming in the fermentation broth, the conditioner also provides excellent properties in the baked goods such as anti-staling, increased loaf volume, and prolonged compressibility. Whereas foaming is no problem in the conventional batch process, be it the straight dough method or the spronge-dough method, the conditioner provides the same quality improvement in the baked goods produced by the conventional process such as reducing firming, increased specific volume and prolonged shelf life as observed in baked goods produced by the continuous process.

BACKGROUND OF THE INVENTION

In the manufacture of baked goods, an increasing number of bakers are resorting to continuous baking processes. These processes permit the reduction of the area needed for equipment, a decrease in labor costs and a scientifically reproducible quality in the baked goods. Most continuous baking procedures are adaptable to the formulas of individual bakeries and to varying throughputs, with only minor changes needed to permit use, by virtually any baker, of continuous equipment.

In continuous baking, generally a broth or brew is prepared which contains the yeast necessary in the baking. Such broths also contain water, salt, sugar, milk, and yeast food. The preparation of this broth separately from the shortening and flour components of the baker's formula eliminates the need for fermentation rooms and large areas which are required in conventional batch baking. By agitating the broth and allowing a sufficient time for fermentation of the broth, the fermented broth can be blended simultaneously with shortening and the desired flour, and the final mixture metered through continuous equipment for development of the dough and loading of baking pans. In some continuous baking procedures flour may be also added to the broth. Generally, the fermentation time prior to incorporation of the shortening into the formula is on the order of two to two and three-quarter hours, while following shortening addition about fifty to sixty minutes are required for the operations preceding baking.

Virtually all commercial bakers add emulsifiers or conditioners to their baked goods for anti-staling effects, more uniform texture and appearance, and other known beneficial properties. Bakers using continuous processes also use such conditioners, and problems often arise as to when and how the addition of such conditioners is to be made. Usually, any conditioners added to the bread formula are mixed into the formula at the shortening tank. At this stage, the full contact time for adequate interaction throughout the mix is not achieved, since the bulk of contact time of mix ingredients comprises the fermentation period. In addition, the mixing of the conditioner with the shortening can cause a deleterious effect upon the slip point of the shortening, which slip point is a measure of the softening point of the shortening. If the slip point is too low, the lard, oil or other shortening may leak from the dough structure, and affect the loaf volume and crum structure of the bread. A discussion of the slip point is given in the article by George W. Trum, "Improvements in Trouble-Shooting-Faults and Corrections" delivered at the American Institute of Baking Continuous Mix Conference, Apr. 24, 1969. Also mentioned in the above article at page 11, is a critical problem that occurs when addition of the conditioner is attempted at the brew or broth level—that of foaming. In any chemical processing, foaming is of course a serious problem and, even if large mix vessels could be used so as to contain such foam, in continuous baking the delicate metering of the mix is destroyed. In a continuous baking process, the metering of the various components is carefully controlled and interference with any portion of the metering balance can greatly affect the quality of the final baked goods.

I have discovered a conditioner for bread that provides the required anti-staling and other benefits needed in bread manufacture, such as large volume and shock resistance of the loaf, the conditioner being readily and safely added to the broth stage of a continuous baking process without causing foam problems.

SUMMARY OF THE INVENTION

A conditioner for baked goods is provided that can safely be added to the fermentation broth of a continuous baking process having 50–80% of specific surface active agents and 50–20% of fatty materials. The conditioner contains 50–80% by weight of a combination of a polyoxyethylene sorbitan ester of a fatty acid having 16–18 carbon atoms or ethoxylated monoglyceride or mixtures thereof; and a saturated monoglyceride, the saturated monoglyceride present in about 15–20% by weight of the conditioner. The fatty materials comprise 50–20% of the conditioner and are selected from hydrogenated fats having an iodine value of 20 or below and unsaturated fats comprising 15–25% of the total conditioner. Preferably, the conditioner is prepared in the form of a thick, creamy aqueous emulsion, with about 40–50% water present in the emulsion.

DETAILED DESCRIPTION

The conditioner of the present invention comprises 50–80% by weight of specific surface active agents and 50–20% of a fatty material. By use of these ratios, the condition can be added to the fermentation broth in a continuous baking process without danger of foaming, and adequate dispersion of the conditioner throughout the dough is insured.

The surface active agents that make up the 50–80 weight percent of the conditioner are a combination of polyoxyethylene sorbitan esters of fatty acids or ethoxylated monoglycerides or mixtures thereof and hard monoglycerides. The polyoxyethylene sorbitan monoesters are reaction products of ethylene oxide and a sorbitan ester of a fatty acid having from 16–18 carbon atoms. Such fatty acids include stearic acid and palmitic acid, the most commonly used. A specifically useful ester is polyoxyethylene (20) sorbitan monostearate, which is commonly known as Polysorbate 60 and has clearance under FDA standards for use in baked goods. These monoesters are known for their ability to act as surfactants, and their individual use in baked goods has been proposed. A further type of first surface active agent that can be used in place of the polyoxyethylene sorbitan esters, or in mixtures therewith, are the ethoxylated monoglycerides which have also been recently cleared for use in baked goods under Federal standards. The ethoxylated monoglycerides, which are described in U.S. 3,433,645, are ethoxylated condensates of monoglycerides containing 10–95 weight percent, preferably 45 to 75% of ethylene oxide based upon 100 parts of the ethoxylated monoglyceride. The preparation of such ethoxylated monoglyceride is described in the above-mentioned U.S. patent, wherein their use in baked goods is described.

The second surface active agent present in the conditioner is a saturated monoglyceride and is present in an amount of 10–15 weight percent of the total conditioner. Saturated monoglycerides are those monoglycerides that are fully or nearly completely saturated and have an iodine value of 5 or below. Commercial monoglyceride is a mixture of mono- and diglycerides with small amounts of triglycerides present, the monoglyceride present in about 40–60% or more. Commercial distilled monoglyceride contains about 90% or more monoglyceride with the balance comprising diglyceride and a trace of triglyceride. Both of these partial glyceride esters serve as emulsifiers and are extensively used in preparing baked goods. The glycerides provide known anti-staling effects and extend the shelf life or softness of bread. The monoglycerides are esters of an edible fat forming fatty acid, preferably saturated fatty acids with 12–22 carbon atoms, monostearin and monopalmitin being most common, and are normally solids at room temperature.

The conditioner also contains 50–20% by weight of a nonsurface active component, namely a fatty material. The term fatty material is used herein to designate fats such as lard, tallow, and also vegetable oils such as soybean oil, cottonseed oil, and other oils that can be substituted for lard in baking. The fatty materials used in the conditioner are a combination of hydrogenated fats having an iodine value of 20 or below and unsaturated fats.

The saturated fatty material having an iodine value of 20 or below is preferably hydrogenated lard but can also comprise saturated tallow or saturated vegetable oils such as soybean oil, cottonseed oil or the like.

The unsaturated fatty material is preferably lard, but as previously described, can be tallow, or vegetable oil, soybean oil, cottonseed oil and the like. The unsaturated fatty material must be present in an amount of 15–25% by weight of the conditioner in order to achieve a non-foaming mixture when the conditioner is added to the fermentation broth of a continuous baking process and maintain the other beneficial properties in the resultant baked product.

Preferably, the conditioner is prepared in the form of a thick aqueous emulsion. The preparation of such emulsions, often called hydrates, is carried out by forming a heated liquid fatty phase containing the conditioner and a heated water phase, combining the two phases with agitation and then cooling the combined phases in cooling and mixing units such as a Votator where a creamy emulsion having the consistency of cold cream is produced. In such emulsion preparation, the polyoxyethylene sorbitan monostearate or ethoxylated monoglyceride, or a mixture thereof are combined with the hard monoglyceride, lard, hydrogenated lard and, if desired, diacetyl tartaric acid ester of monoglyceride and the fatty phase heated to about 170°–180° F. with agitation. A water phase containing the water, citric acid for pH control and sodium propionate as a mold inhibitor is prepared and heated to reflux. The two hot phases are combined at about 185°–195° F. with agitation, and then cooled and agitated to give a thick creamy emulsion.

The aqueous emulsion is prepared by using water in about 40–50% of the total emulsion. The diacetyl tartaric acid ester of monoglyceride when desired is added to the conditioner in an amount of 0–5% based on the total weight of the emulsion and provides a decrease in the gumminess of bread, providing a better slicing loaf. Where an aqueous emulsion is prepared, the use of an acid, such as citric acid, lactic acid, acetic acid, phosphoric acid and the like, prevents mold growth and the amount added is that to give the resultant emulsion a pH of below about 5.0. The addition of sodium propionate or other bacteria and mold inhibitors such as an ammonium, alkaline earth or alkali metal salt of acetic acid, propionic acid, and the like is also made when an aqueous emulsion is formed. Generally, such salts are added in an amount of about 0.25–1.0% based on the total emulsion.

The conditioner, in the form of an aqueous emulsion should be added to a baking formula in an amount of about 4–10 ounces per 100 pounds of flour used in the formula. If an aqueous emulsion is not formed, but rather the conditioner is prepared in a dry form, such as by spray drying the melted fatty phase onto the flour and mixing it with the same to be used in baking, about 2–6 ounces of conditioner will suffice.

In addition to providing a non-foaming broth when added to the fermentation broth of a continuous baking process, the fatty portion of the conditioner provides the conditioner with a higher slip point than is experienced with the surface active agents alone. The proper slip point of shortening in continuous baking is known to be an important fact in producing high quality baked goods. With a slip point that is too low, shortening failure occurs that results in decreased bread volume or lower specific volume. Lower specific volume causes an increased rate of staling. Thus, factors that increase the specific volume retard the staling rate of bread. The addition of the fatty material combination to the surface active agents present in the conditioner of the invention increases the slip point of the fatty mixture and has a beneficial effect upon the quality of bread produced using the conditioner.

The invention is further illustrated in the following examples wherein parts are parts-by-weight unless otherwise indicated.

EXAMPLE I

An aqueous thick emulsion of the conditioner of the present invention was prepared by first separately forming a water phase and a fatty phase having the following components:

| | Weight (pounds) | Percent (total emulsion) |
|---|---|---|
| Fatty phase: | | |
| Polyoxyethylene (20) sorbitan monostearate | 468 | 23.4 |
| Saturated monoglyceride of hydrogenated lard | 144 | 7.2 |
| Diacetyl tartaric acid ester of monoglyceride | 10 | 0.5 |
| Hydrogenated lard (I.V.<2.0) | 192 | 9.6 |
| Lard (unsaturated) | 250 | 12.5 |
| Water phase: | | |
| Citric acid | 14 | 0.7 |
| Sodium propionate | 10 | 0.5 |
| Water | 915 | 45.7 |

The water phase was prepared and heated to boil for 0.5 hour. The fatty phase was agitated and heated to 170–180° F. and then transferred to a heated make-up kettle and the water phase added thereto, with agitation, at a temperature of 185–195° F. Following mixture of the water phase and fatty phase in the make-up kettle, the hot mixture was transferred to discharge kettle and maintained at about 190° F. under agitation, while the mixture was discharged to a Votator cooling apparatus, being cooled to about 125–135° F. in a first cooling unit and to 90–100° F. in a second cooling unit, with agitation, to produce a thick emulsion having the consistency of a cold cream.

EXAMPLE II

The preparation of bread for testing the effectiveness of the conditioner of the present invention was carried out according to the following procedure. Bread was prepared by first mixing the brew or broth ingredients. The brew comprised 1800 grams of water, 105 grams of yeast, 22.5 grams of yeast food, 67.51 grams salt, 180 grams granulated sugar and 11.25 grams (6 ozs. based on 100 lb. flour) of a conditioner prepared according to the procedure of Example I. After agitating for a two hour fermentation period, during which no foaming occurred, the following ingredients were added, 90 grams lard, 15 grams hydrogenated lard, 90 grams granulated sugar, 60 grams non-fat dry milk solids, 45 grams salt, 12 cc. of an oxidant solution containing 0.3 gram of potassium bromate and 0.075 gram of potassium iodate, 2 grams calcium propionate, 240 grams water and 3000 grams flour and remixed for final development. The dough was divided into loaves, proofed to constant height and baked at 410° F. for 18 minutes. The bread had excellent antistaling properties and loaf volume, with the volume of shocked and non-shocked loaves remaining high. A well pleasing texture and whiteness to the bread was evident.

EXAMPLE III

Bread was prepared according to the procedure of Example II but in smaller test quantities to compare the effectiveness of the conditioner of the present invention with that of other commercially available conditioners. When a conditioner prepared according to Example I was added to the formula at the brew stage, no foaming resulted. This bake was labeled "Bake A." In addition, breads were prepared according to the procedure using other commercially accepted and available conditioners. The commercial additives, a mixture of about 60% mono- and di-glycerides and 40% polyoxyethylene (20) sorbitan monostearate (Bake B) and a mixture of about 40% ethoxylated monoglyceride (EMG) and 60% mono- and di-glycerides (Bake C), both caused serious foaming problems when added to the brew. All conditioners were added to the formula in an amount of 6 ounces. The breads were baked and values taken on a conventional baker's compressimeter. The compressimeter data was recorded and evaluated generally according to the procedure described in the article by H. Birnbaum, "Firming Rate of Bread as Affected by the Seasons of the Year and Emulsifier," published in Bakers Digest, December 1956. The results of the compressimeter tests, higher values indicating a softer loaf, are listed in the following table:

| RATING | | | | |
|---|---|---|---|---|
| | 24 hrs. | 48 hrs. | 72 hrs. | 96 hrs. |
| Bake: | | | | |
| A | 49 | 45.5 | 41.5 | 37.5 |
| B | 50 | 46 | 41 | 36 |
| C | 47 | 43.5 | 38 | 34 |

From the foregoing, it is evident that the conditioner of the present invention has at least as good and a somewhat better effect over a long period of time on the bread, in addition to providing a non-foaming brew when added to the fermentation broth mix of a continuous baking procedure.

The effect of the conditioner A is even more surprising in view of the fact that only 1.8 ozs. (30%) of the components of the 6 ozs. of conditioner are known as surface active agents, i.e., the polyoxyethylene (20) sorbitan monostearate and saturated monoglyceride, while both other conditioners (B and C) contain about 4.5 ozs. (75%) of known surface active agents.

EXAMPLE IV

Bread was prepared according to the process of Example II but with a portion (25%) of the flour used being added to the fermentation broth as is done in some continuous baking processes. The brew was prepared by blending 750 grams of flour, 1800 grams water, 90 grams yeast, 22.5 grams yeast food, 22.5 grams salt, 60 grams granulated sugar, 15 grams (8 ozs. to 100 lbs. of flour) of additive prepared according to Example I. After a two hour fermentation period, during which no foaming occurred, there was added 90 grams lard, 15 grams hydrogenated lard, 210 grams granulated sugar, 90 grams non-fat dry milk solids, 45 grams salt, 12 cc. of an oxidant solution containing 0.3 gram potassium bromate and 0.075 gram potassium iodate, 2 grams calcium propionate, 240 grams water and the remaining amount of flour, 2250 grams. Upon mixing and baking, a bread was prepared having the excellent properties of the bread prepared according to Example II.

EXAMPLE V

A conditioner emulsion was prepared according to the procedure of Example I using the following components:

| | Amount (grams) | Percent |
|---|---|---|
| Component: | | |
| Polyoxyethylene (20) sorbitan monostearate | 98 | 23.4 |
| Saturated monoglyceride of hydrogenated soybean oil | 30 | 7.2 |
| Diacetyl tartaric acid ester of monoglyceride of soybean oil | 2 | 0.5 |
| Hydrogenated cottonseed oil (I.V. <2.0) | 40 | 9.6 |
| Hydrogenated vegetable shortening (I.V. 70) (Excello Shortening made by Drew Co.) | 52 | 12.5 |
| Sodium propionate | 2 | 0.5 |
| Citric acid | 3 | 0.7 |
| Water | 191 | 45.6 |

This conditioner, containing vegetable oils in the formula also was used to prepare bread and no foam occurred when the conditioner was added to the fermentation brew. The bread had compressibility and other properties comparable to that of bread prepared using a conditioner of Example I.

EXAMPLE VI

The slip point of the fatty material and surface active agent mixture used in the conditioner of the present invention was determined. The slip point was determined according to the procedure described on page 11 of the aforementioned article by George W. Trum. The fat extract of a conditioner, as prepared according to Example I, contained the following ingredients:

|  | Percent by weight |
|---|---|
| Polyoxyethylene(20)sorbitan monostearate | 44.0 |
| Saturated monoglyceride of hydrogenated lard | 13.5 |
| Diacetyl tartaric acid ester of monoglyceride | 1.0 |
| Hydrogenated lard | 18.0 |
| Lard | 23.5 |

The slip point of this fat extract was found to be 146° F.

A mixture of the surface active agents alone was prepared, using 75.4% polyoxyethylene (20) sorbitan monostearate; 23.0% saturated monoglyceride of hydrogenated lard; and 1.6% diacetyl tartaric acid ester of monoglyceride; a comparable ratio to each other as present in the conditioner. The slip point of this mixture was found to be 130.5° F.

Thus, the slip point of the conditioner where fatty materials such as saturated fats having an iodine value of 2 or below and unsaturated fats are included is greatly increased. This highly beneficial effect on the slip point of the conditioner and subsequently, on the slip point of the shortening added to the baked goods during processing and baking, provides benefits not achieved when other conditioners are used.

EXAMPLE VII

Bread was produced by the two stage mixing (sponge-dough) method. The formula is given in the table.

| Ingredient: | Sponge (grams) | Dough (grams) |
|---|---|---|
| Flour | 800 | 350 |
| Water | 520 | 250 |
| Yeast | 30 | |
| Yeast food | 8 | |
| Salt | | 20 |
| Sugar | | 92 |
| Lard | 18 | 18 |
| Conditioner prepared according to Example I | | [1] 5.75 |
| Non-fat dry milk solids | | 36 |

[1] 8 oz./100# flour.

The sponge was mixed in a 20 quart mixing bowl of a Readco three-speed vertical mixer for two minutes in second speed. Sponge temperature was kept at 78°–79° F. The sponge was allowed to ferment for four hours and then returned for re-mix at a temperature of 89°–90° F. The ingredients listed under dough in the table were added to the sponge and mixed for seven minutes in second speed of the vertical mixer. The dough temperature was kept at 81°–82° F. After remixing, the dough was allowed 15 minutes floor time at 82° F. The bulk dough was divided and shaped into four round pieces, and the dough pieces were allowed to rest 12 minutes in a draft-free cabinet, care being taken to prevent the formation of a crust on the dough surface. The rested dough pieces were molded into loaves, then placed into baking pans whose dimensions were: bottom, 3 9/16 x 7 7/17 inches, top inside, 4 7/16 x 8 7/16 and depth, 2 12/16 inches. The average pan volume was 1360 cc. so that the ratio of pan volume to dough weight amounted to 3.5. The loaves were proofed at a temperature of 103°–105° F. and 85 percent relative humidity. The time of proof was kept under one hour. The loaves were proofed to a uniform height of 3¾ inches. The bread was baked 18 minutes at 415° F. in a four tray Despatch oven. The loaves were allowed to cool at the prevailing temperature in the test bakery, which was not air-conditioned, for one hour and then the volume of the loaves was measured by the seed replacement method.

Bread thus produced by the sponge-dough method has excellent volume, good masticating properties, taste and flavor and extended shelf life with good initial softness.

I claim:

1. A dough conditioner for baked gods which, when added to a yeast fermentation broth of a continuous baking process provides a non-foaming broth, comprising a mixture of:
   (a) 50–80 percent by weight of combined surface active agents comprising a first agent selected from the group consisting of (1) a mixture of a polyoxyethylene sorbitan monoester of a fatty acid having 16–18 carbon atoms and ethoxylated monoglycerides, and (2) ethyloxylated monoglycerides and a second agent comprising a saturated monoglyceride, and
   (b) 50–20 percent by weight of combined fatty materials selected from the group consisting of saturated fats having an iodine value of 20 or below and unsaturated fats, the unsaturated fats being present in an amount of about 15–25 percent by weight of the mixture.

2. A dough conditioner for baked goods as defined in claim 1 wherein said first agent is ethoxylated monoglyceride.

3. A dough conditioner for baked goods as defined in claim 1 wherein said saturated fat is hydrogenated lard having an iodine value of 20 or below and said unsaturated fat is lard.

4. A dough conditioner for baked goods as defined in claim 1 wherein said first agent is a combination of 50–90 percent by weight polyoxyethylene (20) sorbitan monostearate and 50–10 percent by weight ethoxylated monoglycerides.

5. A dough conditioner for baked goods as defined in claim 1 wherein said mixture is in the form of a thick creamy aqueous emulsion.

6. A dough conditioner for baked goods in the form of a thick creamy aqueous emulsion as defined in claim 5 wherein a mold inhibitor is added to the aqueous emulsion in an amount of about 0.25 to 5 percent by weight of the emulsion and said emulsion is at a pH of about 4 or below.

7. A dough conditioner for baked goods as defined in claim 1 wherein there is added to the conditioner 1 to 10 percent by weight of a diacetyl tartaric acid ester of monoglyceride.

8. A dough conditioner for baked goods as defined in claim 1 in the form of a thick, creamy, aqueous emulsion wherein the emulsion contains 0.5 to 5 percent by weight of a diacetyl tartaric acid ester of monoglyceride.

9. In a continuous baking process wherein a fermentation broth is prepared and later admixed with shortening, flour and other ingredients of a bake formula, the improvement comprising adding to the fermentation broth a conditioner for the baked goods comprising a mixture of:
   (a) 50–80 percent by weight of combined surface active agents comprising a first agent selected from the group consisting of (1) a mixture of a polyoxyethylene sorbitan monoester of a fatty acid having 16–18 carbon atoms and ethoxylated monoglycerides, and (2) ethoxylated monoglycerides and a second surface active agent comprising a saturated monoglyceride, and
   (b) 50–20 percent by weight of combined fatty materials selected from saturated fats having an iodine value of 20 or below and unsaturated fats, the unsaturated fats being present in about 15–25 percent by weight of the mixture.

10. In a continuous baking process as defined in claim 9 the additional improvement comprising adding said mixture in an amount of 4–10 ounces, based on one hundred pounds of flour used in the formula, of the conditioner in the form of thick, creamy, aqueous emulsion.

11. In a continuous baking process as defined in claim 10, the additional improvement of adding to the emulsion 0.5 to 5 percent by weight based on the emulsion, of a diacetyl tartaric acid ester of monoglyceride.

12. In a continuous baking process as defined in claim 10 wherein a portion of the flour of said bake formula is added to said fermentation broth and the remainder of said flour added subsequent to the fermentation period.

References Cited

UNITED STATES PATENTS

| 3,547,655 | 12/1970 | Knightly et al. | 99—91 |
| 2,689,797 | 9/1954 | Joffe | 99—91 |
| 3,433,645 | 3/1969 | Egan et al. | 99—91 |

RAYMOND N. JONES, Primary Examiner

J. R. HOFFMAN, Assistant Examiner

U.S. Cl. X.R.

99—91

UNITED STATES PATENT OFFICE
CERTIFICATE OF CORRECTION

Patent No. 3,679,430          Dated July 25, 1972

Inventor(s) Hermann Birnbaum

It is certified that error appears in the above-identified patent and that said Letters Patent are hereby corrected as shown below:

Column 1, line 27 delete "spronge" and insert therefor --sponge--.
Column 2, line 10 delete "crum" and insert therefor --crumb--.
Column 2, line 42 delete "20" and insert therefor --25--.
Column 2, line 55 delete "condition" and insert therefor --conditioner--.
Column 5 in the Table, in the heading, insert --COMPRESSIMETER-- before "RATING".
Column 7, line 3 after "produced by" insert --the conventional batch method, using--.
Column 7, line 48 in Claim 1, delete "gods" and insert therefor --goods--.
Column 7, line 57 in Claim 1, delete "ethyloxylated" and insert therefor --ethoxylated--.

Signed and sealed this 15th day of May 1973.

(SEAL)
Attest:

EDWARD M. FLETCHER, JR.
Attesting Officer

ROBERT GOTTSCHALK
Commissioner of Patents